US005242527A

United States Patent [19]
Meschi

[11] Patent Number: 5,242,527
[45] Date of Patent: Sep. 7, 1993

[54] SPLICING APPARATUS FOR PRINTER SUPPLY

[75] Inventor: Luciano Meschi, Castiglioncello, Italy

[73] Assignee: Industria Grafica Meschi S.r.L., Leghorn, Italy

[21] Appl. No.: 807,078

[22] Filed: Dec. 13, 1991

Related U.S. Application Data

[62] Division of Ser. No. 478,218, Feb. 19, 1990, Pat. No. 5,106,358.

[30] Foreign Application Priority Data

Feb. 9, 1989 [IT] Italy ............................ 19360 A/89

[51] Int. Cl.[5] ...................... B65H 5/28; B65H 21/00; G06C 11/10; G11B 33/06

[52] U.S. Cl. .................................. 156/505; 156/523; 156/577

[58] Field of Search .............................. 493/8, 10-11, 493/17-18, 27, 33, 324, 345-347, 381-382, 393-394, 411-415; 156/502, 504-506, 509, 157, 159, 523, 577; 83/79-80; 225/106

[56] References Cited

U.S. PATENT DOCUMENTS

| | | | |
|---|---|---|---|
| 3,567,555 | 3/1971 | Stenzenberger et al. | 156/509 X |
| 3,769,140 | 10/1973 | Sayer | 156/502 |
| 4,239,582 | 12/1980 | McGrath | 156/505 |
| 4,289,556 | 9/1981 | Booth | 156/506 X |
| 4,421,590 | 12/1983 | Meschi | 156/157 X |
| 4,507,109 | 3/1985 | Meschi | 493/413 X |
| 4,576,673 | 3/1986 | Lenzi | 156/502 X |
| 4,618,340 | 10/1986 | Meschi | 493/412 X |
| 4,729,812 | 3/1988 | Meschi | 493/412 X |
| 4,729,813 | 3/1988 | Meschi | 156/157 X |
| 4,832,786 | 5/1989 | Meschi | 156/157 X |
| 5,106,358 | 4/1992 | Meschi | 493/415 |

FOREIGN PATENT DOCUMENTS

| | | | |
|---|---|---|---|
| 847915 | 10/1939 | France | 493/414 |

*Primary Examiner*—William E. Terrell
*Attorney, Agent, or Firm*—McAulay Fisher Nissen Goldberg & Kiel

[57] ABSTRACT

Splicing apparatus for a laser printer and to assist in carrying out an operating method for a service apparatus for laser printers having a pair of conveying belts with upper surfaces parallel, co-planar and displaceable in the same direction and having a stationary splicing area provided between the conveyor belts with fixed and movable anchors for the temporary anchoring of two sheets to be spliced, and an adhesive tape supported for unwinding by two V-shaped gorges having an apex flush and aligned with the splicing line, and a motor coupled with a frame for the translation thereof between a first position in which it forms the upper cover for an exit from the service apparatus of the laser printer and a second position in which it is displaced towards one end in a cantilevered manner, so as to uncover and give access to the exit of the service apparatus.

3 Claims, 14 Drawing Sheets

SPLICING APPARATUS FOR PRINTER SUPPLY

This application is a division of application Ser. No. 07/478,218, filed Feb. 9, 1990, now U.S. Pat. No. 5,106,358.

BACKGROUND OF THE INVENTION

The present invention relates to a service apparatus for quick printers (laser printers), particularly for receiving, piling up and transferring continuous sheet material coming out of the laser printer.

The data processing and their transfer onto paper by means of printing have been radically changed in the last 15 to 20 years, whereby today even modest data processing lines, such as for example electroaccounting centers, billing centers or invoice emitting centers and the like, are usually provided with a high speed printer like a laser printer.

The printer is fed with a continuous band of paper, which hereinafter shall be also indicated as a continuous form, starting both from a reel and from sheet packages previously folded and prepared or provided with weakening lines for tearing or separating.

For a better understanding of the technical problems faced and solved by the present invention it seems advisable to shortly sum up the operations and processings which must be carried out on the paper.

The paper, which at the beginning is in a form of a reel of virgin or unused paper is firstly provided with side holes serving for the purpose of dragging the paper through the several parts of the apparatus; these holes which are spaced by a unit pitch, are formed by means of perforating disks or cylinders having a number of punches protruding peripherally therefrom. It is evident that this operation besides being a first operation carried out on the paper, is perfectly consistent with a constant and continuous advancement of the paper, such as that which takes place in the laser printing.

Then the paper, according to the prior art, is provided with weakening lines for a tearing or separation of adjacent parts. These lines are mainly crosslines, so as to individuate a series of forms by which the continuous band fed to the printer is formed. Besides these crosslines and other weakening lines can be added, such as for example those of the so-called self-enveloping forms, in which opening by tearing of edge strips is carried out. In all cases of cross weakening lines, the optimum condition for carrying them out is that of stopping. However, for a very short time, the paper is kept under a constant predetermined tension, while having it undergo the action of a crosswise perforator.

When it is not possible to stop the paper, a complicated mechanism was proposed, such as for example helicoidal blades which are crosswise positioned and rotated synchronously with the advancement of the paper.

The thus obtained paper is then folded, at the cross weakening lines, in order to permit it to be collected with an accordion like configuration to form a package with one sheet superimposed over the other, and the separation into a form of packages may be carried out either before or after they pass through a laser printer.

To date the perforating operation to provide the cross weakening lines and usually also the folding lines have been carried out upstream of the laser printer, preferably out of the feeding line of the printer.

In more recent years, and as a matter of fact from the beginning of the eighties, these centers have been provided with service apparatus (the so called servants) adapted to process the paper both before the entry into and after the exit from the printer.

More specifically, as regards the entry, there have been proposed and manufactured apparatus of two types depending on the manner in which the printer is fed, namely:

from a reel from a package.

Whereas for the first type, the continuous form is unwound from the reel, and for the second type, there have been proposed and manufactured apparatus to carry out the splicing between the last sheet or bottom sheet of a package, preferably already in the position for the feeding to the printer, and the first sheet or top sheet of the next package.

As examples of apparatus of this second type those disclosed in the European Patent No. 42619 and in the European Patent Application No. 86,101,511 owned by the same Applicant, can be cited.

Turning now to the exit apparatus, their purpose is that of receiving the paper processed in the laser printer and pile it up into packages comprising a predetermined number of sheets. These packages are then transferred to the next processing steps, such as for example the tearing and the folding as an envelope for the mailing in the case for instance of self-enveloping bills or invoices.

It is evident that this apparatus may show and have problems which are not negligible due to the high speed by which the continuous form comes out of the laser printer (about 80 cm/s, corresponding to 1–4 sheets per second).

Secondly the problems are to be considered deriving from the passing of the paper within the laser printer, especially if of the so-called hot type, because the paper tends to be warped and bulged instead of being laid down in a planar and uniform manner onto an underlying sheet of the pile being formed. These problems and difficulties have originated a number of proposals for apparatus to overcome these problems, among which are those described in the U.S. Pat. Nos. 4,507,109, 4,618,340 and 4,650,447 of the same Applicant can be cited.

These proposals are all based on the principle of collecting the paper coming in, and helping with the folding of the paper by means of bladed shafts, onto a receiving plane. The plane can be gradually lowered as the height of the package being formed increases and lowering takes place until a package having the desired size is formed, and thereafter, a cutting blade device carries out the cutting of the incoming paper band at a folding edge. Also, above the cutting device a plane or equivalent member, in order to provide for a temporary support of the paper band continuously arriving from the printer, is interposed, thus permitting the transfer of the paper from the receiving plane of the finished package separated from the incoming paper.

The essential problem which those apparatus had to face and solve was that of making the high speed and continuous working or operation of the laser printer consistent with the several operations which are required both upstream and mainly downstream of the printer.

Otherwise stated, owing to the fact that the primary and absolute requirement was and is that of "serving" the laser printer respecting its working rate, the service apparatus was based on the principle of maintaining the continuous advancement of the paper band which cannot be stopped in a time period higher than a few seconds at a maximum.

Consequently, the service inlet apparatus, for the splicing of subsequent packages of virgin forms, takes advantage from the package being fed to the printer as a storage or reserve to provide the time necessary for the splicing operation. In the case of the service exit apparatus, for which a greater number of complicated operations, as already mentioned, are necessary, the time necessary for their carrying out has been obtained by having recourse to the temporary supporting plane, positioned upstream of the position at which the operations of piling up, cutting and removal of the formed package take place.

Obviously, the fact that the paper cannot be stopped even for short periods of time, is to a detriment of some operations. An example of the situation when the paper cannot be stopped are printing operations upstream or downstream of the laser printer which cause a dragging of the holes and the weakening of the lines or traces for the tearing or separating of adjacent sheets. These can be carried out only by recourse to mechanisms which are complicated but also mainly require operation with a strict synchronism with respect to the other component parts of the machine. Thus, as a matter of practice, results in a reduced reliability and above all readily undergoing stopping both due to the loss of synchronization and due to operations such as size changes requiring the substitution of gears or their adjustment.

All that is obviously not consistent with the service requested in the case of a laser printer whereby as already mentioned these operations have been to date carried out separately.

For other operations, such as a cutting and a removal of a finished package, on the contrary, the apparatus, in order to achieve the given purposes, is very complicated from a mechanical point of view and requires very strict synchronism. As known to every skilled technician, the machines of this type may readily undergo a jamming and consequently require a frequent maintenance and assistance, resulting in high operation costs while adding to the intrinsic cost of the apparatus which is not negligible. The above mentioned apparatus according to the prior art moreover has a not negligible encumbrance, whereby to provide a laser printer with a service apparatus both at the entry side and the exit side means to create a line of relevant proportions, which are not always consistent with the requirements of the user and with the available room.

On the other side the provision of an apparatus which:

(1) has a reduced encumbrance together with a greater functionality;

(2) is able to operate starting both from reel and from packages;

(3) has reduced mechanical complexity and greater flexibility;

(4) besides the essential operations of piling up of the continuous form as a package, separation and removal thereof, permits other operations as the standard printing of the continuous form, for instance in a number of colors either upstream or downstream of the laser printer, the carrying out of the weakening lines used for the tearing in line with the laser printer, and the like; and (5) in the same encumbrance of the exit service apparatus combine also the entry service apparatus as regards the splicing of subsequent packages, is a very desirable industrial target.

These purposes are achieved with the present invention on the basis of a totally different operating principle. One is to decompose the substantially continuous and unbroken motion of the continuous form through the laser printer into a succession of pulse motions consisting of unit advancements and stops of the paper band downstream of the laser printer, and if necessary upstream thereof. For advancements, the paper is under control both as regards the length which is being advanced in each unit advancement and as regards the speed at which such an advancement occurs. The stops are exploited to carry out single operations, such as for example tearing of the tie part used for tying of the finished package, by tearing the tie from the band arriving from the laser printer, with the proviso that each stop has a duration less than the maximum stop time permitted for the laser printer without it entering the phase of self cleaning maintenance. This time is of the order of some seconds, usually 4.5 seconds.

According to a first feature, thus, the present invention consists in an operation method for a service apparatus for laser printers. The service apparatus is of the type comprising a basement or lower part, dragging means for the paper band entering the apparatus and coming from the laser printer, means for advancement of the paper band from the laser printer to a receiving plane for piling up the sheets forming the paper band into or as a package, means for separation of the last sheet of the package being completed from the upstream band, and means for folding of the paper before the piling up onto said receiving plane, preferably when the laser printer is fed from a reel. The operating method provides for the dragging means to be intermittently actuated for predetermined times with intervals of stopping times which are also strictly predetermined.

According to the preferred embodiment of the present invention said dragging means consist of a form dragging device or tractor of a standard type, driven by motor means, preferably consisting of a stepping motor. Control means is provided for the motor means in order to actuate them in a pulse manner for intervals of strictly predetermined duration and stop them for times which are strictly predetermined as well in order to carry out required operations on the paper coming from the laser printer occurring during said stopping times of said motor means.

The service apparatus according to the present invention in turn is characterized in that:

1) said means for the separation of the last sheet of the package being complete from the paper band coming from the laser printer consist of a tearing mechanism comprising means controllably engageable with the paper band in order to retain it is an area upstream of a predetermined pre-formed weakening crossline, means for the frictional advancement of the band, roller means which can be engaged under control with a side band in an area downstream of said predetermined weakening cross line and deviating means adapted to hit the side band at said predetermined weakening cross line;

2) said folding means comprise a member oscillating around a horizontal axis for a predetermined angle in both directions, having a passage in which said paper band coming from said tearing means is vertically advanced, first comb-like or toothed means against which said oscillating member abuts at the end of the oscillating arc, whereby the paper band is retained between said oscillating member and the said first comb means, and the second comb or toothed means adapted to oscillate around a horizontal axis between a first rest position and a second operating position in which said second comb means abut against said oscillating member whereby the paper band is clamped in a position downstream with respect to the clamping position between said first comb means and said oscillating member, and consequently the paper is folded with an acute edge around the edge of said oscillating member; said apparatus furthermore comprising:

3) cage means receiving the band coming out of said folding means, the bottom of which is formed by said receiving plane, movable by means of motor means between a raised initial position and a lowered final position; the cage is moreover defined by two side walls, parallel to the folding edge of the paper, formed by vertical, parallel and spaced rods, which can be simultaneously displaced in the direction of mutual approaching and removal with respect to the center or mid line of said receiving plane coincident with the laying plane of the paper band passing through said tearing means, each of said walls having rigidly connected thereto a pressing member adapted to engage from above the edge of at least one sheet just laid down onto said receiving plane; and the pressing members are actuated by means for alternated movements of pressing and withdrawal;

4) switch means fixed to at least one of said side walls actuatable from means rigidly connected to said pressing means in their pressing stroke, and the switch means is adapted to control the lowering movements of said receiving plane;

5) ejecting means for the packages piled up onto said receiving plane which can be crosswise displaced with respect to said receiving plane in a direction parallel to said laying plane of the paper band;

6) a splicing mechanism for the packages being fed to the laser printer comprising a frame forming the upper surface of the apparatus, said frame comprising a pair of conveying belts having the upper surfaces parallel and coplaner, each conveying belt being closed to itself and actuated by autonomous motor means for the displacement in the same direction for each belt, a stationary splicing area being provided between said conveying belts comprising at the first end fixed means for the temporary anchoring of the two sheets to be spliced and towards the opposite end displaceable plate means having second temporary anchoring means for said two sheets to be spliced, cutting means mounted at both sides and symmetrically with respect to said first and second anchoring means, adhesive tape supporting and unwinding means such that a strip of adhesive tape can be unwound parallely to the splicing line between said two sheets positioned with the approached ends, and guide and positioning means for said strip of adhesive tape consisting of two V shaped gorges, the apex of which is flush and aligned with said splicing line, the flanks of said gorge being coated with anti-adhesive material, and motor means for the translation of said frame between a first position in which it forms the upper cover of said exit service apparatus and a second position in which it is displaced towards one end in a cantilevered manner, so as to uncover and give access to said exit service apparatus;

7) a cross perforation device, mounted upstream of said dragging means to act onto the paper band arriving from the laser printer, comprising a perforating blade having a saw-toothed cutting edge and preferably formed with a curved shape with its convexity directed towards the paper to be perforated, actuating means connected at both ends of said blade and subjected to a vertical alternating movement whereby the lowering of one end corresponds to the raising of the other end and vice versa.

The particular features and advantages of the present invention shall more clearly appear from the following detailed description, made with respect to the enclosed drawings, of a preferred embodiment, which have an exemplifying but not a limiting purpose.

DESCRIPTION OF THE PREFERRED EMBODIMENTS

Referring firstly to FIGS. 1, 3, 4 and 5, the apparatus according to the invention comprises a parallelepipedal base or basement 10, mainly formed by two longitudinal body sides 12 and 14.

For sake of clarity of drawing and of description some component numbers of standard type and known in the related art have been omitted or indicated only in a summary manner; among them, it is to be mainly cited the dragging mechanism or tractor indicated as a whole by the reference 11 with which the paper band S coming from the laser printer is engaged. This tractor, as already mentioned, has an extremely important function in the apparatus according to the invention. It is actuated by means of a stepping motor 13 which is controlled by the logic of the apparatus as a function of the size of the forms constituting the continuous band of paper coming out of the laser printer.

The band S is advanced in a controlled length and at a speed controlled too at determined intervals by the logic of the machine by which the stepping motor 13 is controlled, taking obviously into account the characteristics of the motor itself.

It is also evident that, taking it into account the operating conditions namely the maximum stop time of the laser printer and the time for carrying out the several operations foreseen downstream of the dragging mechanism (pressing, folding, tearing, etc.), it is not difficult for a skilled technician to suitably program in the same manner, the control logic of the apparatus.

Figure 1:
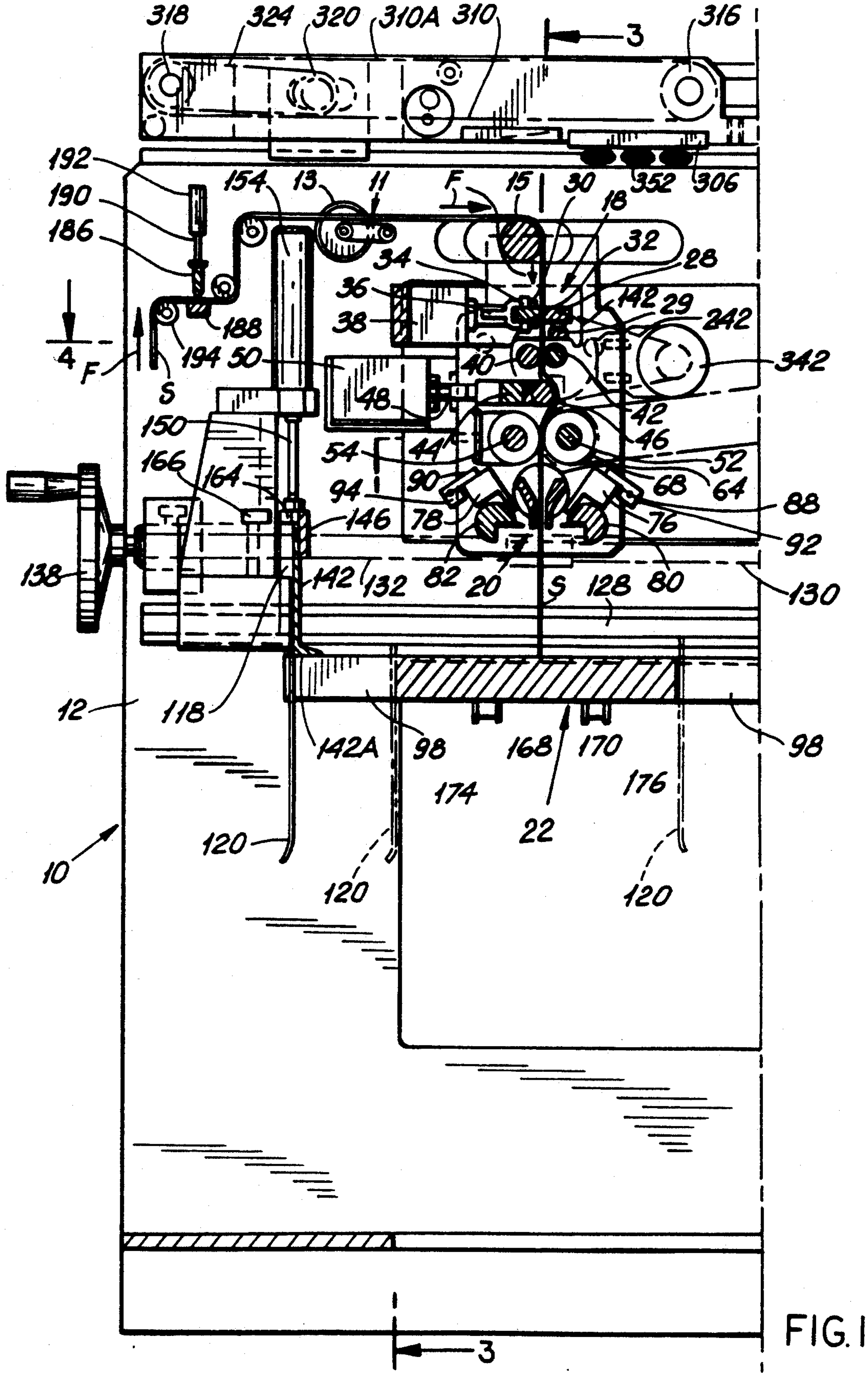
FIGS. 1 and 1A are side elevation views, partially cross-sectioned of the apparatus according to the invention in two operating conditions.
Figure 1:
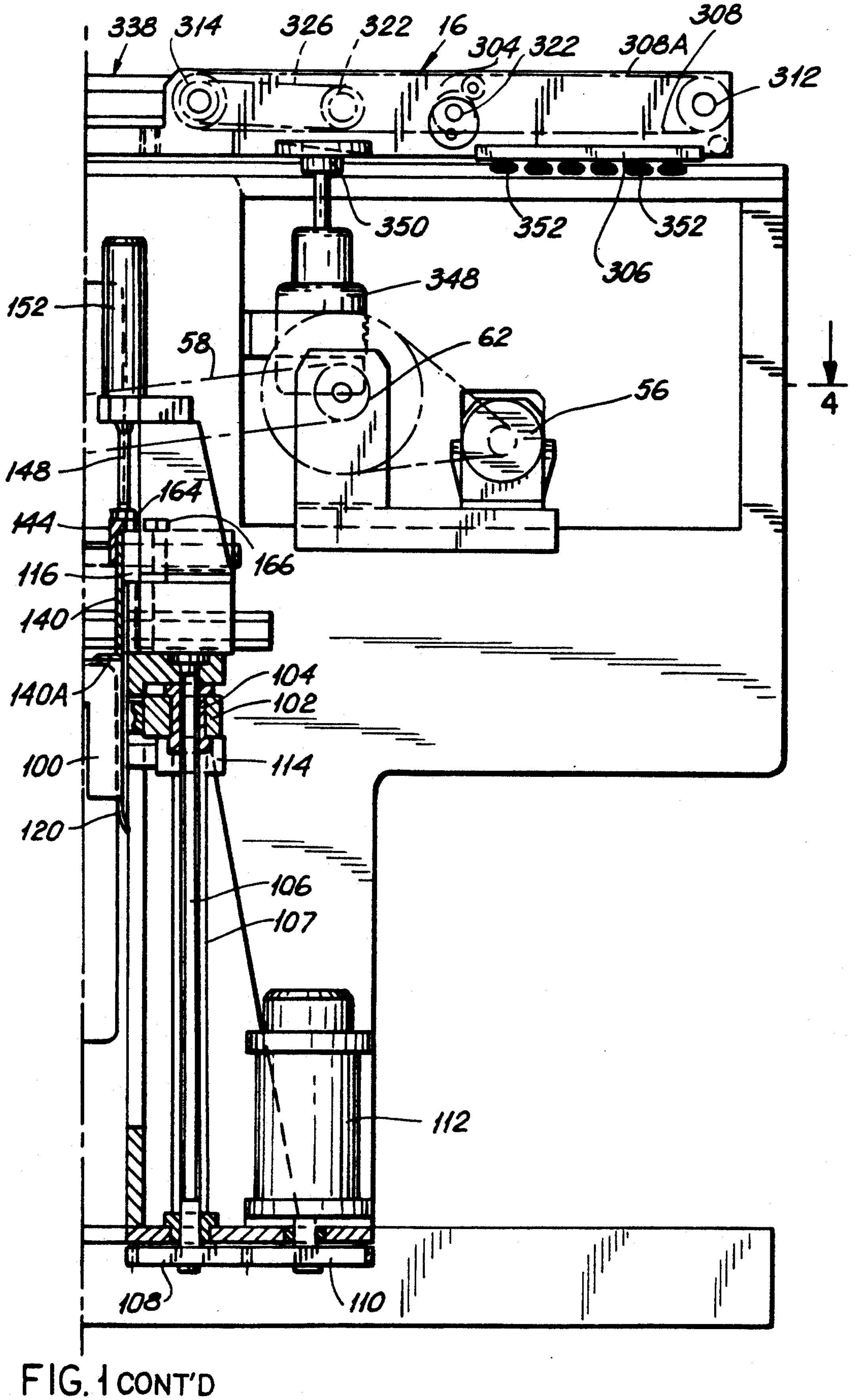

Looking at FIG. 1 and omitting for the time being the displacing mechanism (indicated on the whole and generally with the reference 16) which also designates the upper cover, the following mechanisms and devices are seen:

a) tearing mechanism 18;

b) folding mechanism 20;

c) receiving and piling up plane 22.

Taking firstly into consideration the tearing mechanism 18, it is mounted in a fixed position between the two body sides or shoulders 12 and 14 and comprises two side plates or shelves 24 and 26 (see FIG. 3) mounted to the aforesaid shoulders, between which two clamping bars or rods 28 and 30 are fixed, each being provided along the edge of reciprocal contact, with a layer of resilient material such as rubber, generically indicated by the reference 32.

Looking at the aforesaid rods, the rod 28 is mounted in a fixed position by means of the support 29, whereas the ends of the rod 30 are each fixed to a respective bracket 34 formed onto the stem of the magnetic anchor or armature of an electromagnet 38, fastened to the base or basement 10 of the apparatus.

The rods 28 and 30 are in position normally removed from each other, with the anchors 36 withdrawn within the related electromagnets 38, whereby between the two rods a space remains for the free passage of the paper band coming along the direction indicated by the arrow F.

Below the rods 28 and 30 and parallely thereto, two dragging rollers 40 and 42 are mounted. The first roller is idle whereas the second roller is driven into rotation by a suitable continuous current motor 342 at a constant speed, by means of a pulley 142 and a belt 242 using a proper clutch. The rollers 40 and 42 provide for the advancement of the paper band downwardly, always in the direction of the arrow F, at the desired speed.

Vertically below the rollers 40 and 42, a device is provided for the deviation and an auxiliary means for the tearing, is provided comprising a horizontal plate 44, the outer edge of which is provided with a U shaped profile and rounded edge 46, and along the whole edge it has a round aspect. The plate 44 is rearwardly fixed to the anchor stem 48 of an electromagnet 50 mounted to the body of the machine.

In the rest condition the anchor 48 is withdrawn, so that the rounded edge 46 of the plate 44 (FIG. 1A) does not intercept the vertical path downwardly of the paper band. Lastly two rubber coated rollers 52 and 54 are foreseen, the first of which is driven by a motor and is rotated at &he desired speed by motor means, represented by gear motor 56 and by transmission chain 58 with the respective pinions 62 and 64, through a quick coupling clutch 60, whereas the roller 54 is idle.

Figure 4:
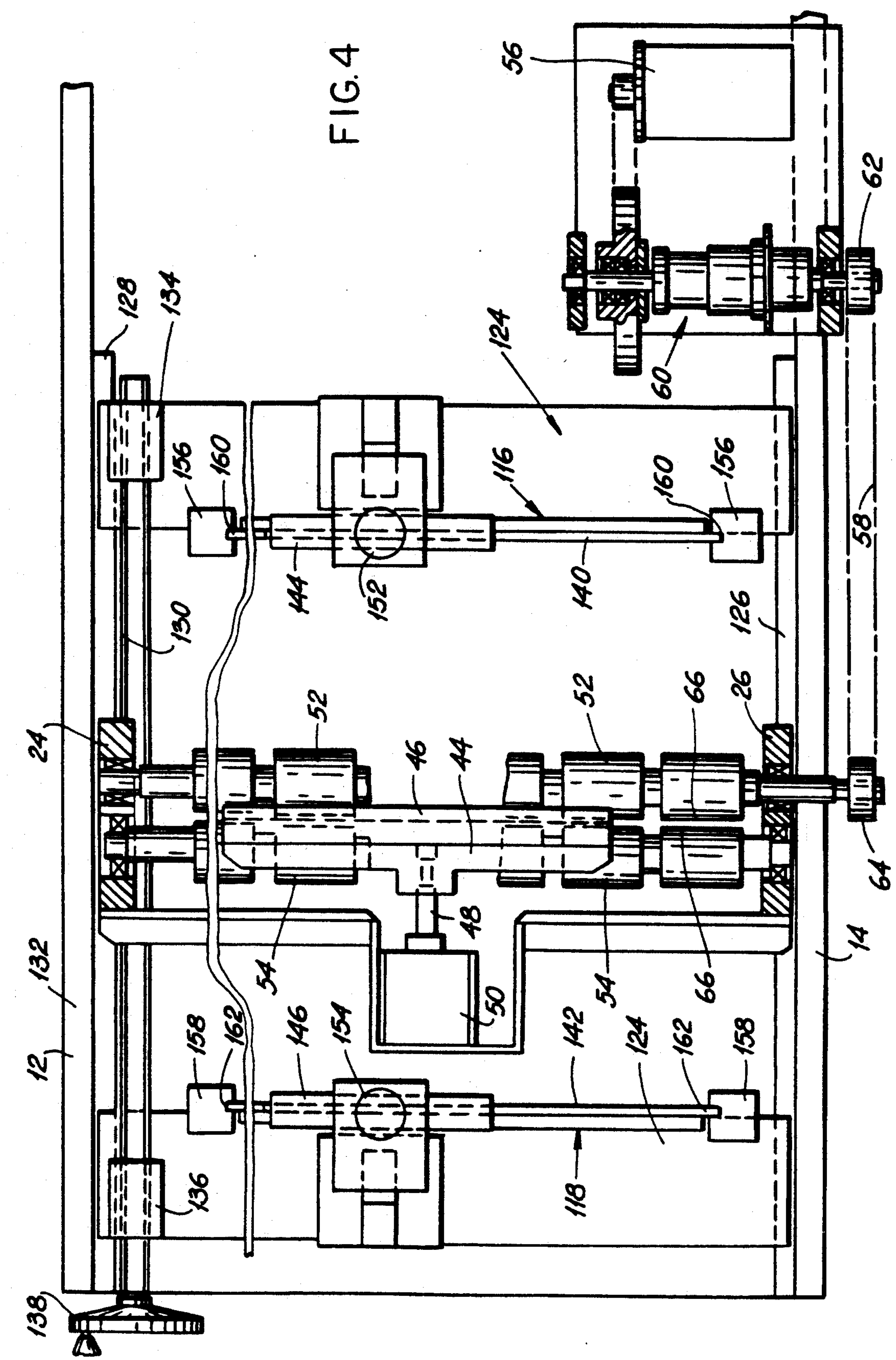
Figure 5:
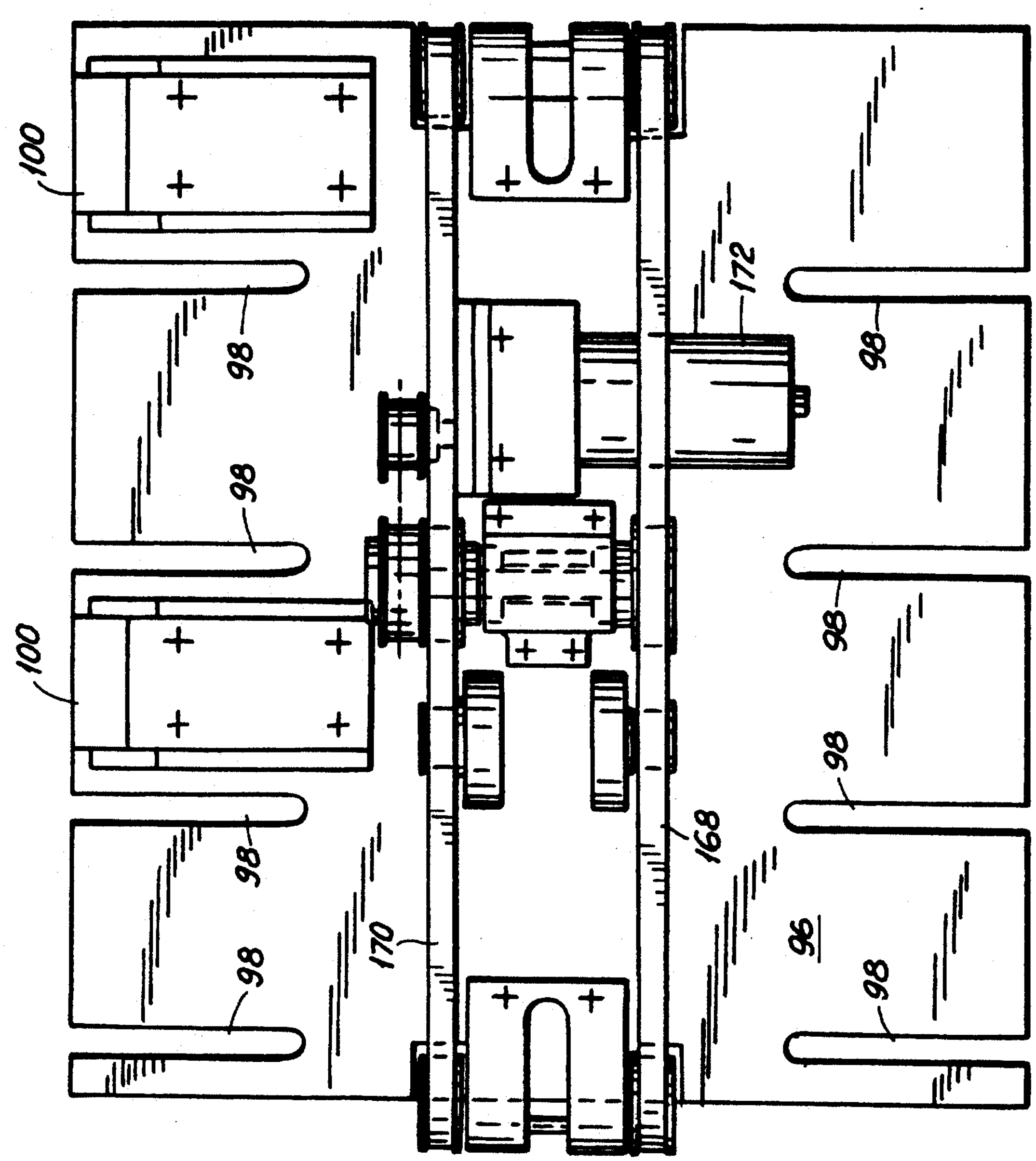
FIG. 5 is a plane view taken from below, in detail, according to the direction of the arrow V of FIG. 6, of the receiving plane for the piling up of the continuous form.
Figure 8:
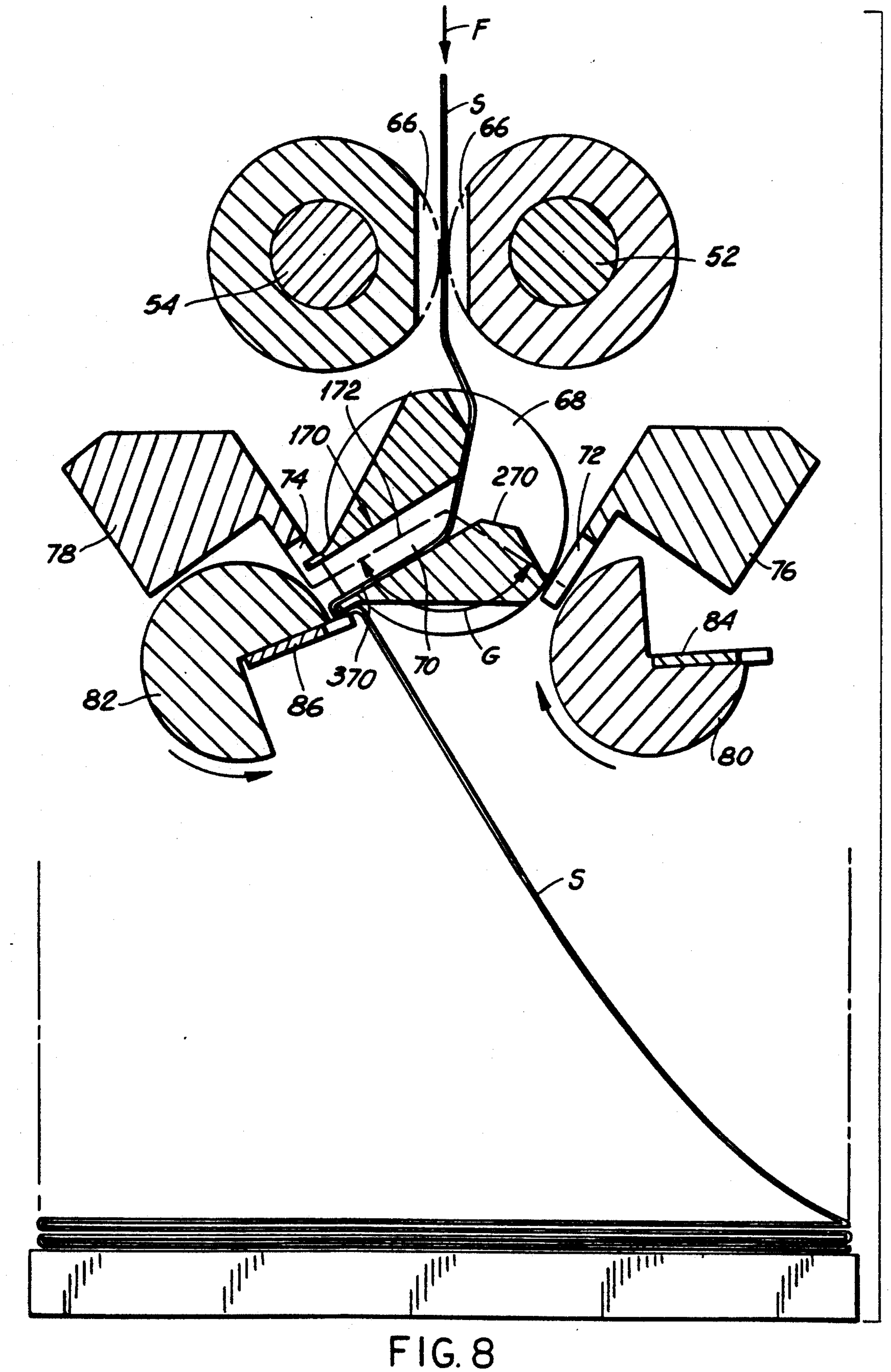
FIG. 8 is a detailed view on enlarged scale of the folding mechanism and the FIG. 8A is enlarged view of a detail thereof.

As clearly shown in FIG. 4, the two rubber coated rollers 52 and 54 are grooved at regular intervals and are provided with a partial axial milling 66 (milling aligned with the axis of the roller) whereby in the rest position their facing surfaces do not interfere, since the aforesaid millings are in a face to face relationship with each other, see FIG. 8.

At the time of the tearing, the rotation of the roller 52, which also causes the roller 54 to rotate, and bringing the facing surface of the two rollers to reciprocally interfere, since the millings 66 are no longer facing each other.

Figure 8A:
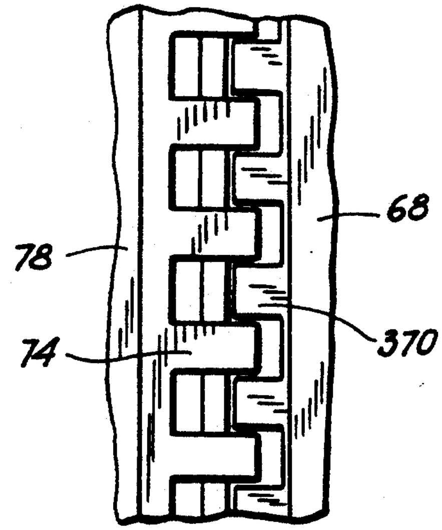

Turning now to the folding mechanism 20, this comprises a roller 68 provided for a sufficient part of its length (anyhow greater than the maximum width of the paper band to be processed) with a cross slit 70, see FIG. 8, centered on its axis 172, aligned with the direction of descending vertical motion of the paper band S (indicated by the arrow F). The slit 70 consists of a metal profile 170 having a flared and radiused mouth 270 and a radial part 370, see FIG. 8A which protrudes at its end from the surface of the roller 68. The portions of radial part 370 protruding from the surface of the roller 68 are shaped as a comb having wide teeth.

The roller 68 is driven into rotation alternately for a predetermined angle by motor means (not shown), such as a stepping motor, in the direction of the arrow G of FIG. 8, and during this rotation comes into engagement with fixed combs 72 and 74 symmetrically mounted at the two sides of the roller 68 and having two profiles 76 and 78 secured to the shoulders 12 and 14 of the base 10.

Below the combs 72 and 74 the rollers 80 and 82 are mounted, from each of which an angular sector has been removed and having along one of the two rays defining the aforesaid angle sectors a second pressing comb, 84 and 86 respectively.

A rod, 88 and 90 respectively, (see FIG. 1A) is fixed onto each profile 76 and 78, supporting deviating nozzles 92 and 94, through which air jets at a predetermined pressure are fed.

Figure 6:
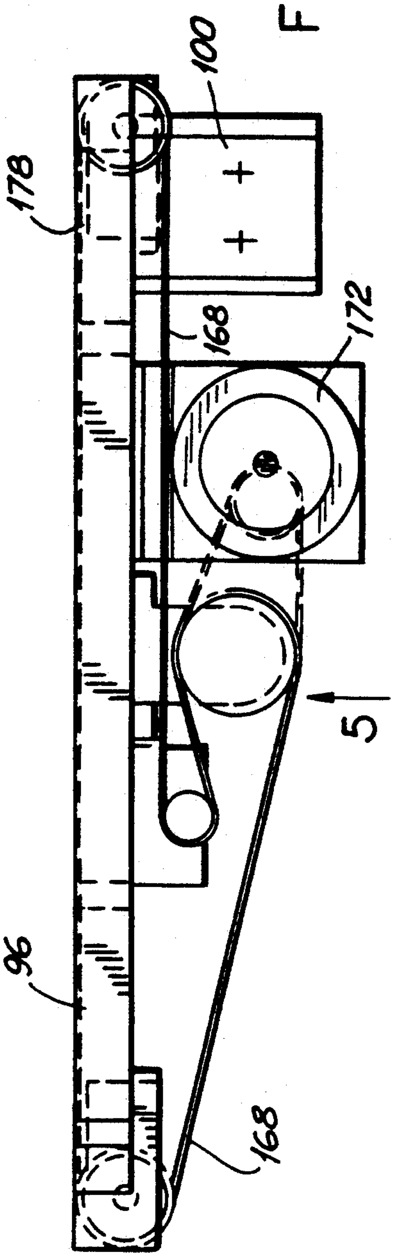
FIG. 6 is a side elevation view of the plane of FIG. 5.
Figure 7:
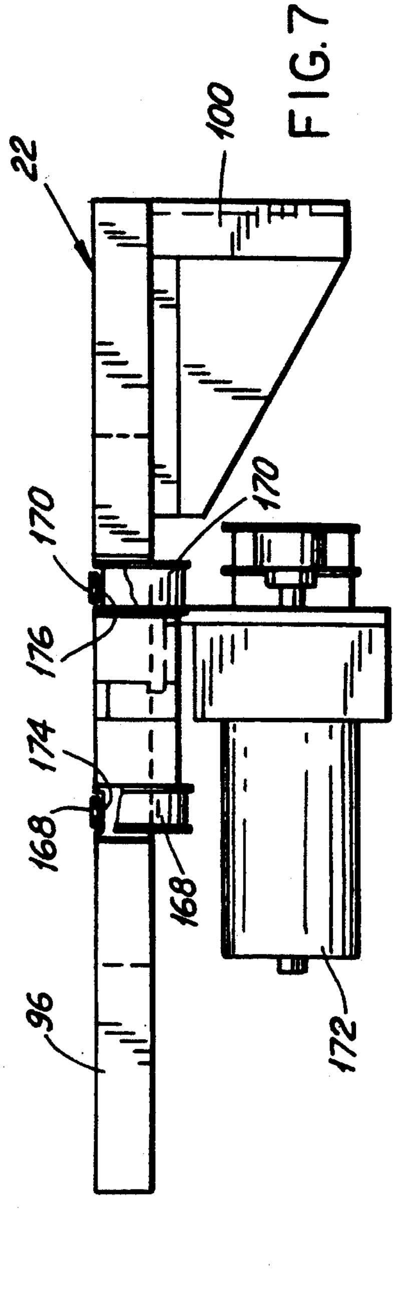
FIG. 7 is a view of the same plane of FIG. 5, frontally seen at 90° with respect to FIG. 6.

As it will be clarified hereinafter, this folding mechanism is in operation essentially only when the band S is not previously folded namely when the laser printer is fed from a reel and not from a package (even if in some cases it may be operating also to rectify the fold in a continuous form coming from a package). Below the device 20 the receiving plane 22 is mounted which is more detailedly shown, besides, in FIG. 1, also in the FIGS. 5, 6 and 7.

This receiving plane consists of a plate 96 two sides of which, perpendicular to the shoulders 12 and 14 of the base, are provided with equally spaced and symmetrical slits 98 which permit the adjustment as to the width of the containing walls of the sheet pile being formed, as it will be explained hereinafter.

The plate 96 is a cantilevered portion (see FIGS. 1 and 1A) of a shelf 100 rigidly connected to a saddle 102 having a lead nut 104 engaged with the thread of a nut screw 106.

The latter terminates at its lower end which is connected with a gear 108 engaging a pinion 110 driven into rotation by a motor 112. The vertical movement of the shelf 102 is helped and guided by two cylindrical rods 107 along which sleeves 114, are freely slidable; and rods 107 are rigidly connected to the shelf 100.

Figure 10:
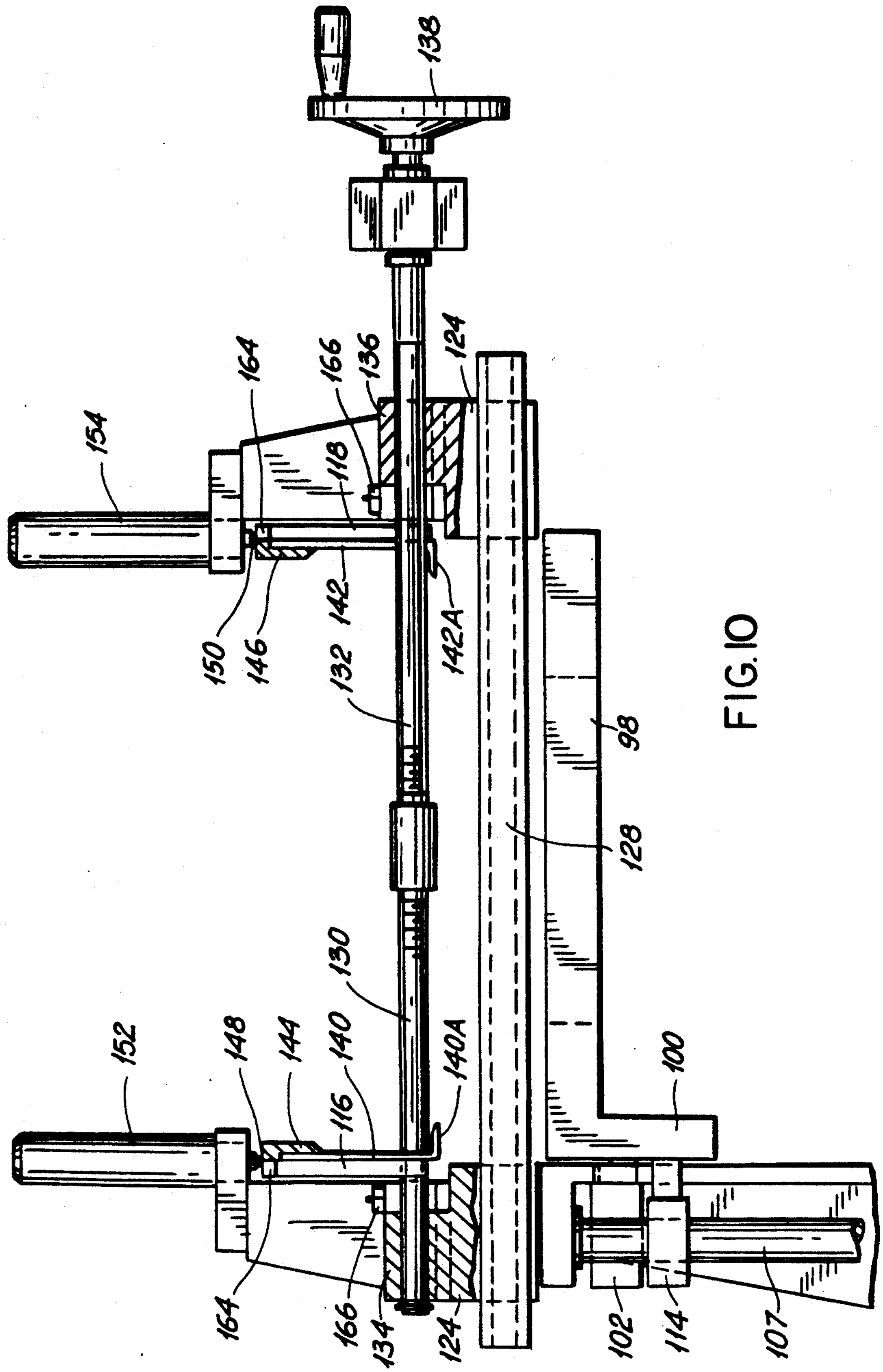
FIG. 10 is a detailed view on enlarged scale of a detail of the apparatus of FIG. 1.
Figure 11:
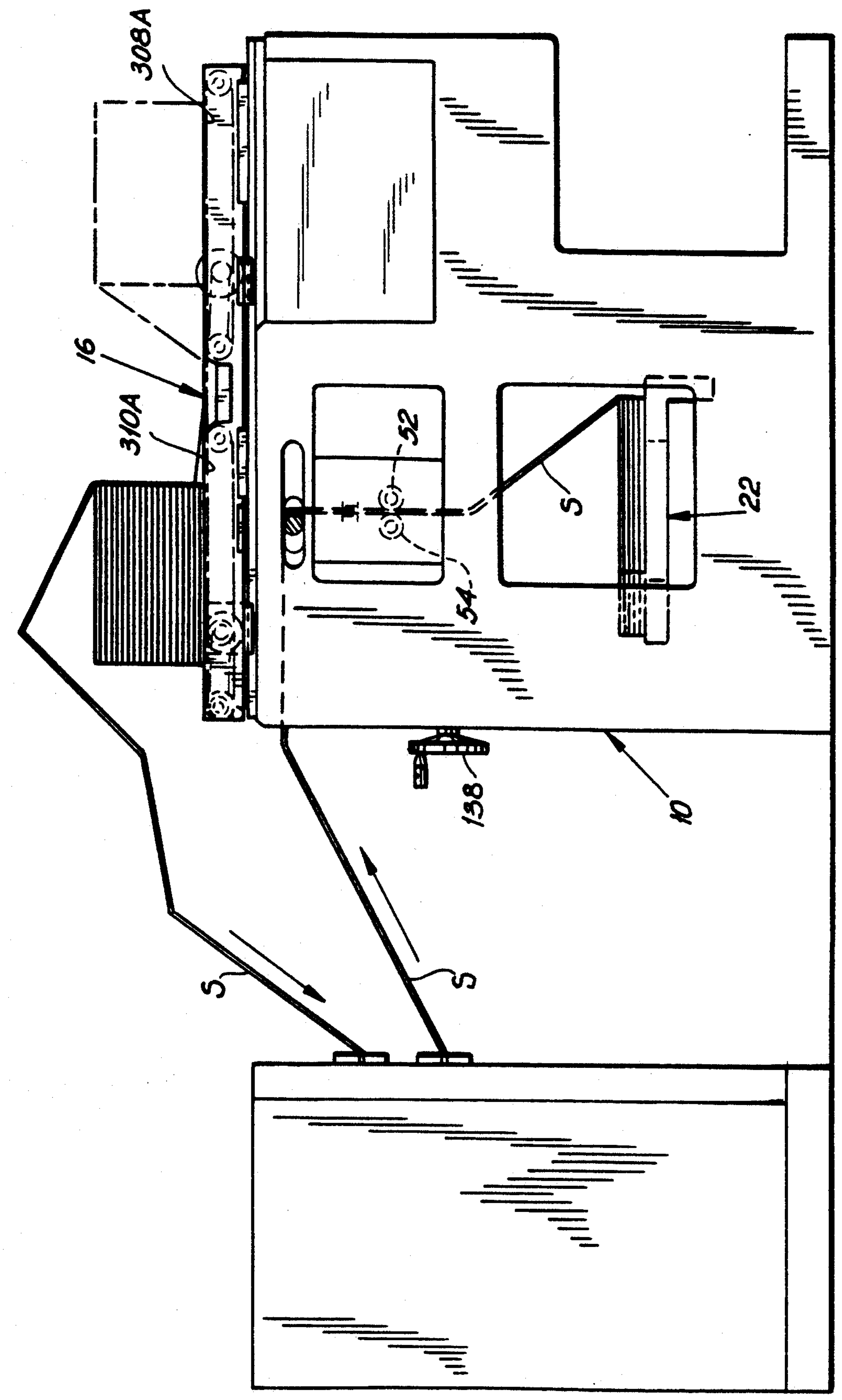
FIG. 11 shows a general scheme of the processing line to which the apparatus according to the invention is applied.

In order to sidewise define the containing cage of the sheets to be piled up sidewalls are foreseen (see FIGS. 1A, 4 and 10), which are movable and self centering, indicated by the generic references 116 and 118. The two walls 116 and 118 are identical and symmetrical to each other. The wall 118, detailedly shown in FIG. 3, comprises a number of vertical rods 120, the number of which is equal to that of the slits or slots 98, the rods 120 terminating with a stop end plate 122. Walls 116 and 118 each comprise a shoulder 124 having two side sliding grooves 126, in which guiding profiles 128 are engaged, protruding from the shoulders 12 and 14 of the base 10.

Along the shoulder 12 a screw is rigidly connected having two symmetrical portions oppositely threaded, respectfully 130 and 132, with which respective nuts 134 and 136 are in screwing and unscrewing engagement, the nuts being rigidly connected to the respective side walls 116 and 118.

The screw can be actuated from outside by means of a handle 138 and, by rotating the latter in one direction or in the opposite direction, the nuts 134 and 136 and the respective walls are approached to or separated from each other maintaining the symmetry with respect to the descending plane of the paper band S.

Brackets 156 and 158 (see FIG. 4) provided with sliding guide grooves 160 and 162 are connected to the side walls 116 and 118, in said grooves the ends of the L shaped plates, respectively 140 and 142 being engaged, with the short side 140A and 142A (see FIGS. 1A and 10) of the L protruding towards the inside of the receiving plate 96. To the vertical or major side 140B and 142B of the plates 140, 142 the upper ends of the rods 120 are fixed whereby the latter are displaced together with the walls 116 and 118. The upper end of the L shaped plate is fixed to the foot, it being also L shaped 144, 146, of a stem 148, 150 of a ram and piston assembly 152, 154.

Consequently the adjustment of the spacing of the walls 116 and 118 involves the automatic centering also of the plates 140 and 142 for the purpose hereinafter described.

Each plate 140 and 142 is provided with a magnetic plate 164, adapted to engage, during the descending motion controlled by the ram and piston assembly 152, 154, a proximity switch 166, for the purpose hereinafter described. The plane of the receiving plate 96 is furthermore provided with an ejecting means for the removal of the complete package consisting of two belts or bands 168, 170D, symmetrical with respect to the mid line of the plane of the receiving plate 96 and driven from a motor 172 and a suitable motion transmission chain.

The belts 168 and 170 are housed within appropriate recesses 174, 176, formed within the receiving plate 96 defining the plane and are rigidly connected to fingers 178 which through a per se known mechanism take a position protruding from the plane of the receiving plate 96, whereas they take a position parallel to the lower surface thereof during the return stroke.

For the outwardly ejection of the package received and completed onto the plane of the receiving plate 96, in the shoulder 12 a discharge opening 180 is provided having a safety switch 182 along the upper edge and at least a pair of photocell detectors 184 at the central section of the discharge opening, whereby whatever attempt of introducing a hand or other foreign body through the opening 180 causes the apparatus to be immediately stopped. Of course the removal of the completed package can take place through a like opening as that of opening 180 and provided in the opposite shoulder 14.

DESCRIPTION OF OPERATION

The operation of the apparatus according to the present invention shall be now described with reference to the case of the feeding from a reel and of the feeding from a package, respectively.

In the case of the feeding from reel upstream of the dragging device a cross perforation device is provided, comprising a blade 186, of curved shape with the convexity directed downwardly and having a sawtoothed cutting edge, in order to obtain a discontinuous perforation.

Below the blade and vertically aligned therewith, an anvil support 188 is provided.

The ends of the blade are rigidly connected to the step 190 of two cylinder and piston assemblies 192, said stems being movable between a position totally protruding and a position totally withdrawn, whereby through a proper synchronization, the two stems are alternatively and oppositely in the condition totally withdrawn and totally extended.

Consequently the blade 186 shall carry out an oscillating motion, like a crescent, with the resulting perforation of a paper which in that time is positioned between the blade and the support 188.

If the control of the cylinders 192 is synchronized with the pulse motion of the paper band S and particularly with the stopping times it is evident that the cross perforation is effected each time a unitary length of paper is advanced, corresponding to the desired form without further need of synchronizing mechanical members.

Moreover, as it is evident as well, the paper band passing through the laser printer has only the drugging side holes and is much more resistant to the tension forces, in this way eliminating one of the frequent causes of jamming of the laser.

1) Reel feeding.

In this case the laser printer is fed with continuous form unwound from a paper reel which in turn may be either virgin or pre-processed.

In the first case the paper passes to a per se known device by which the side dragging holes are punched, whereas in the second case this operation has been already effected at a separate station.

In both cases, the laser printer is fed with a continuous form already provided with side holes and possibly with foldings.

At the exit of the printer, the continuous form enters the apparatus according to the invention through one or more reserve devices, per se known and not shown, having the function of temporarily compensating for the instantaneous difference of speed of paper within the printer and within the exit servant, as well as to compensate for the instantaneous paper return towards the laser printer which takes place each time the latter is stopped for whatever reason.

From the reserve device, the last roller 194 of which is shown, the paper passes within the tractor 11, after the cross perforation operation has been carried out in the already described manner, and is advanced in the direction of the arrow F up to the deviating roller 15 and therefrom vertically to the space between the two bars 28 and 30 which are in the rods position and consequently removed from each other (the electromagnet 38 is deenergized).

The paper then comes to the interference between the rollers 40 and 42 by means of which it is dragged and advanced.

The descending motion of the paper then continues freely (FIG. 1A), since the underlying deviating device (44, 46, 48, 50) is in the withdrawn position (electromagnet 50 deenergized) and lastly the paper passes between the milled portions 66 of the rubber coated rollers 52 and 54, coming out of the tearing mechanism.

When an operation of tearing of the paper band S must be carried out, by means of a proper synchronization the rods 28 and 30 are clamped to each other through the energization of the electro-magnet 28, so that a weakening cross line is essentially positioned at the level of the rounded edge 46 of the deviating device. At the same time the rubber coated rollers 52 and 54 are operated whereby the band portion below the aforesaid tearing line is engaged and drawn downwardly owing to the interference between the rubber coated surfaces of the rollers 52 and 54.

Simultaneously the energization of the electromagnet 50 causes the horizontal plate 44 to crosswise come out, the round edge 46 of which hits the paper sheet which is now under tension just at the weakening cross line, whereby a net and instantaneous tearing is assured, (according to the well known principle by which a hit applied to a paper band having a weakening line and under tension at such a weakening line, causes its immediate and complete tearing). The paper band, downstream of the tearing device, enters the axial passage 70 of the cylinder 68 of the folding device. As it is clearly shown in FIG. 8 each time a fold must be provided in the paper band, the cylinder 68 rotates by the predetermined angle, in either direction (leftwise in the case shown in FIG. 8) whereby the paper is brought into contact with the comb 74. At the same time the counterclockwise rotation of the roller 82 brings the pressing comb 86 against the rear edge of said protruding portion of the profile 170 whereby the paper is retained in the manner shown in FIG. 8 and the fold is formed.

The simultaneous return of the roller 82 in the rest position and of the cylinder 68 in the position in which the axial passage 70 is vertically aligned with the descending direction of the paper band S causes the latter to be freed and, as it is shown in FIG. 8, to be laid down onto the receiving plane 96.

Each time a tearing operation is carried out whereby the package of sheets piled up onto the plane 96 is removed in the manner as hereinafter described, the first sheet of the band S which comes through the axial passage and is subjected to the first folding is guided to be laid down with the proper laying onto the receiving plane 96 again ready by means of air jets which are controlledly and alternatively emitted from the nozzles or rows of nozzles 92 and 94, which are operated only in that phase.

Figure 9:
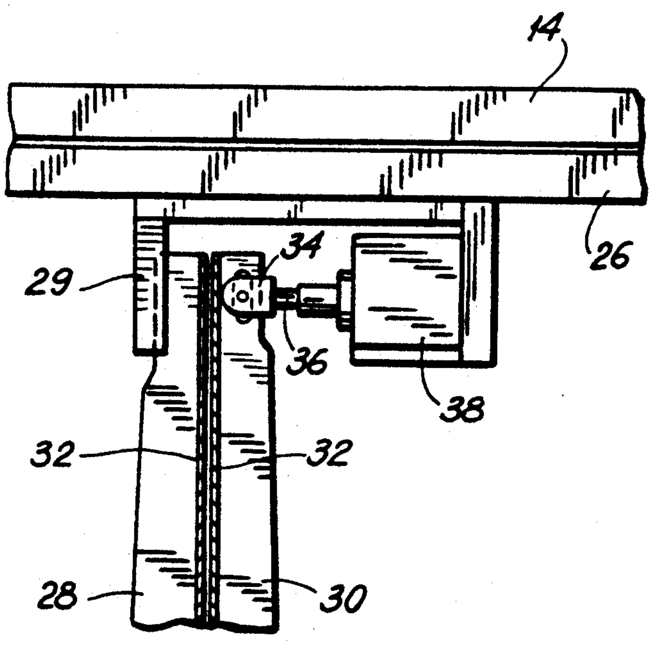
FIG. 9, is a detail view, on enlarged scale of a component of the tearing device.

Turning now to the receiving plane, the latter receives the sheets in the manner shown in FIG. 9 and, every time from 5 to 10 sheets have been laid down, a proper synchronized control causes alternatively one of the two cylinder and piston assemblies 152 and 154 to be actuated whereby sides 140A and 140B of the corresponding L shaped plate 140 and 142, effect a quick pressing stroke of the folded edges of the sheets which are consequently compacted against the plane of the receiving plate 96. Every time this stroke is carried out, the magnetic plate 164 actuates the proximity switch 166. When such an actuation of the proximity switch 166 does not occur, it means that the paper level on the receiving plane of plate 96 has achieved a predetermined level, and consequently a command is sent to the motor 112 and the receiving plane of plate 96 is caused to be lowered until the magnetic plate 164 contacts proximity switch 166 and operates the aforesaid proximity switch 166.

This gradual lowering of the receiving plane of plate 96 takes place until the package being formed has reached the predetermined level (and thus contains the predetermined number of sheets). At this point a command of operation of the tearing device is given in the hereinbefore described manner and at the same time, once the tearing operation is completed and the last sheet has been laid down onto the package, the package transfer fingers are actuated carrying out the cross stroke whereby the package is pushed out of the apparatus through the opening 180.

At that point the receiving plane returns to the starting position and the laying down of the next paper sheets coming through the folding mechanism takes place again.

2) Package feeding.

Figure 1A:
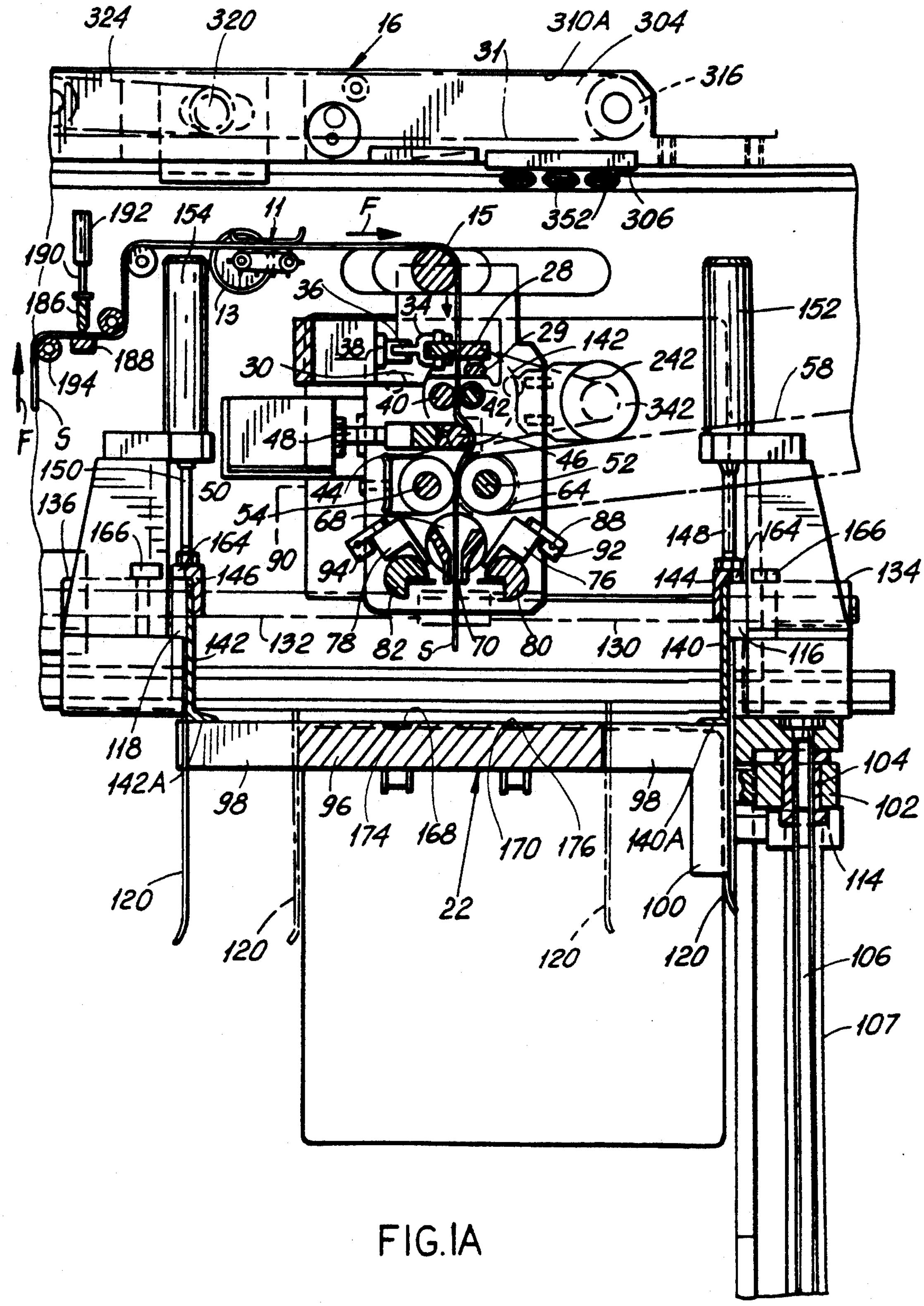
Figure 2:
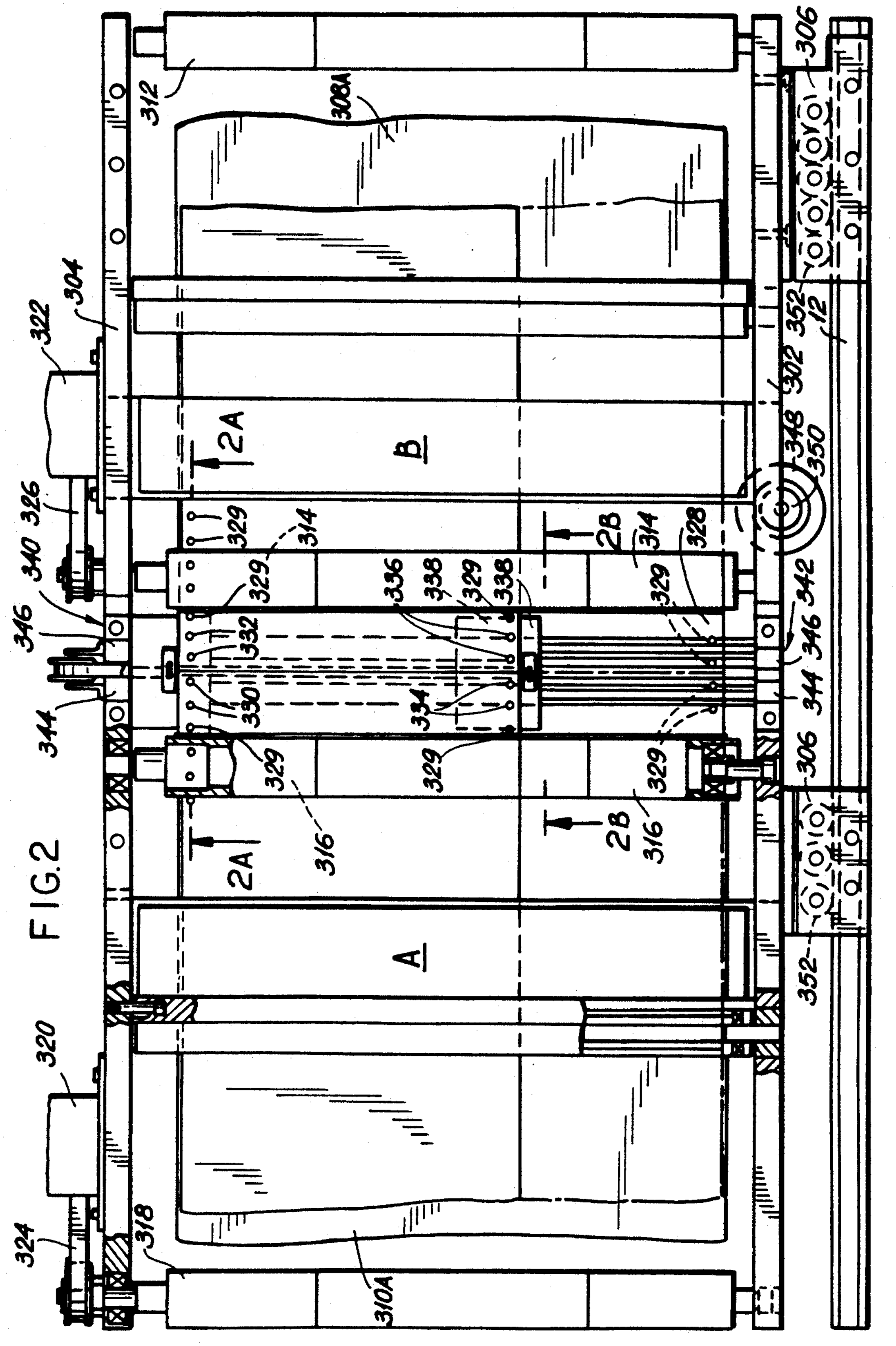
FIG. 2 is a plane view taken from the top of the apparatus of FIG. 1.
Figure 2A:
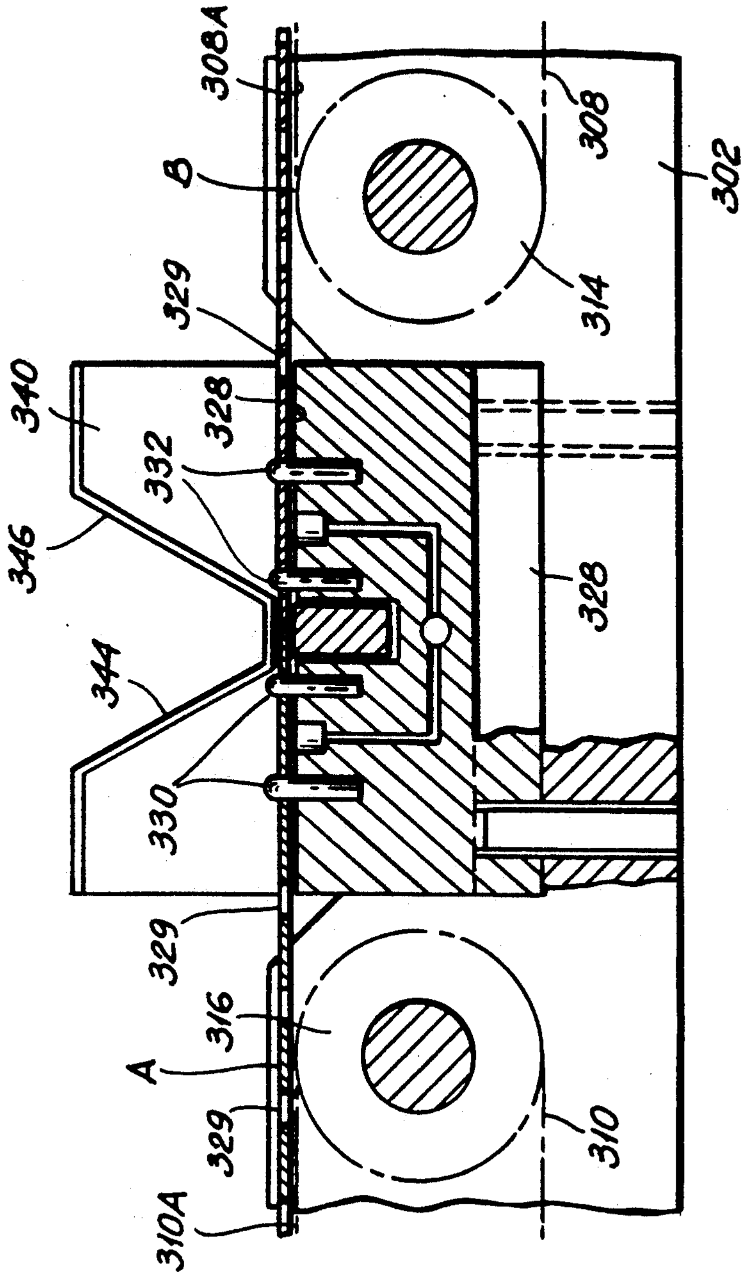
FIGS. 2A and 2B are detailed cross-sectional views of FIG. 2 according to the lines IIA—IIA and IIB—IIB.
Figure 2B:
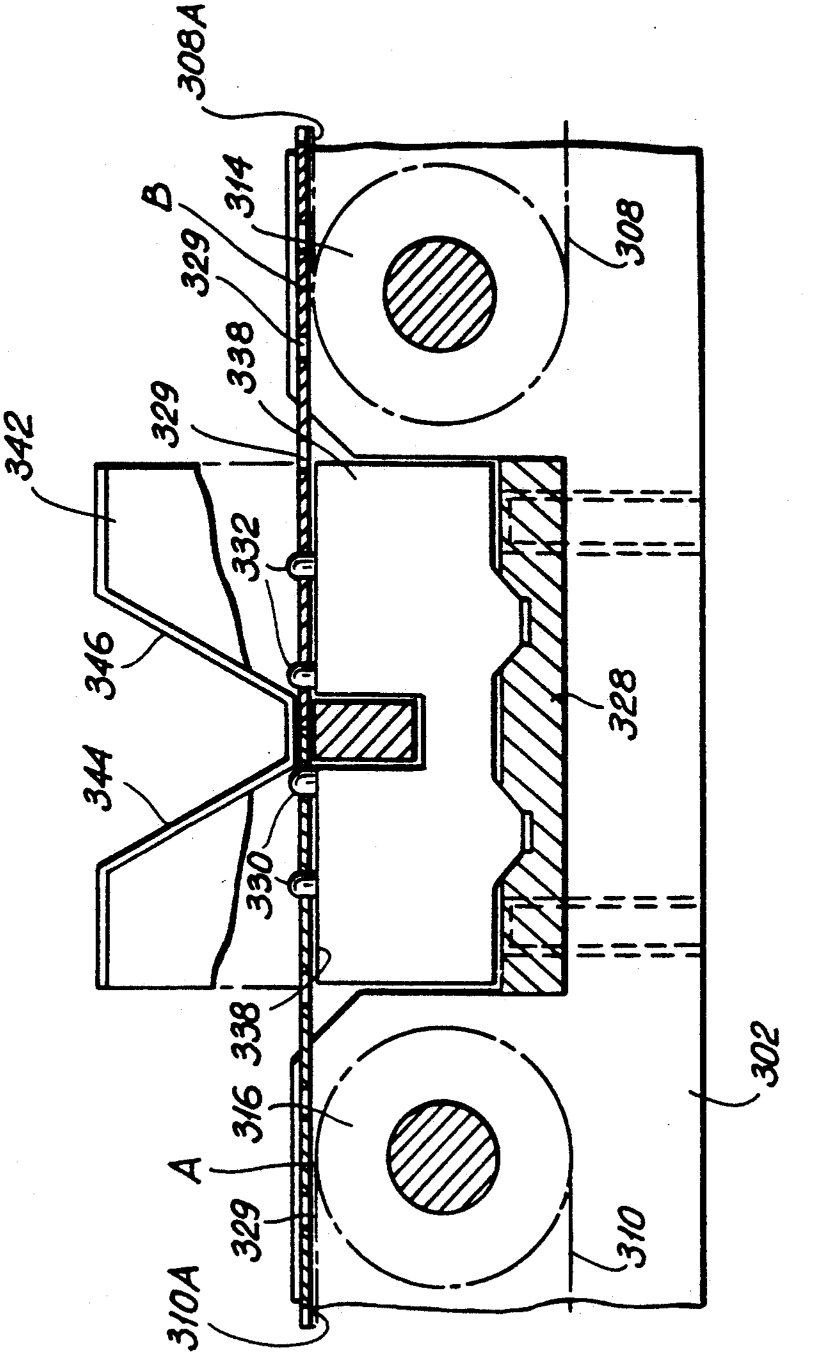
Figure 3:
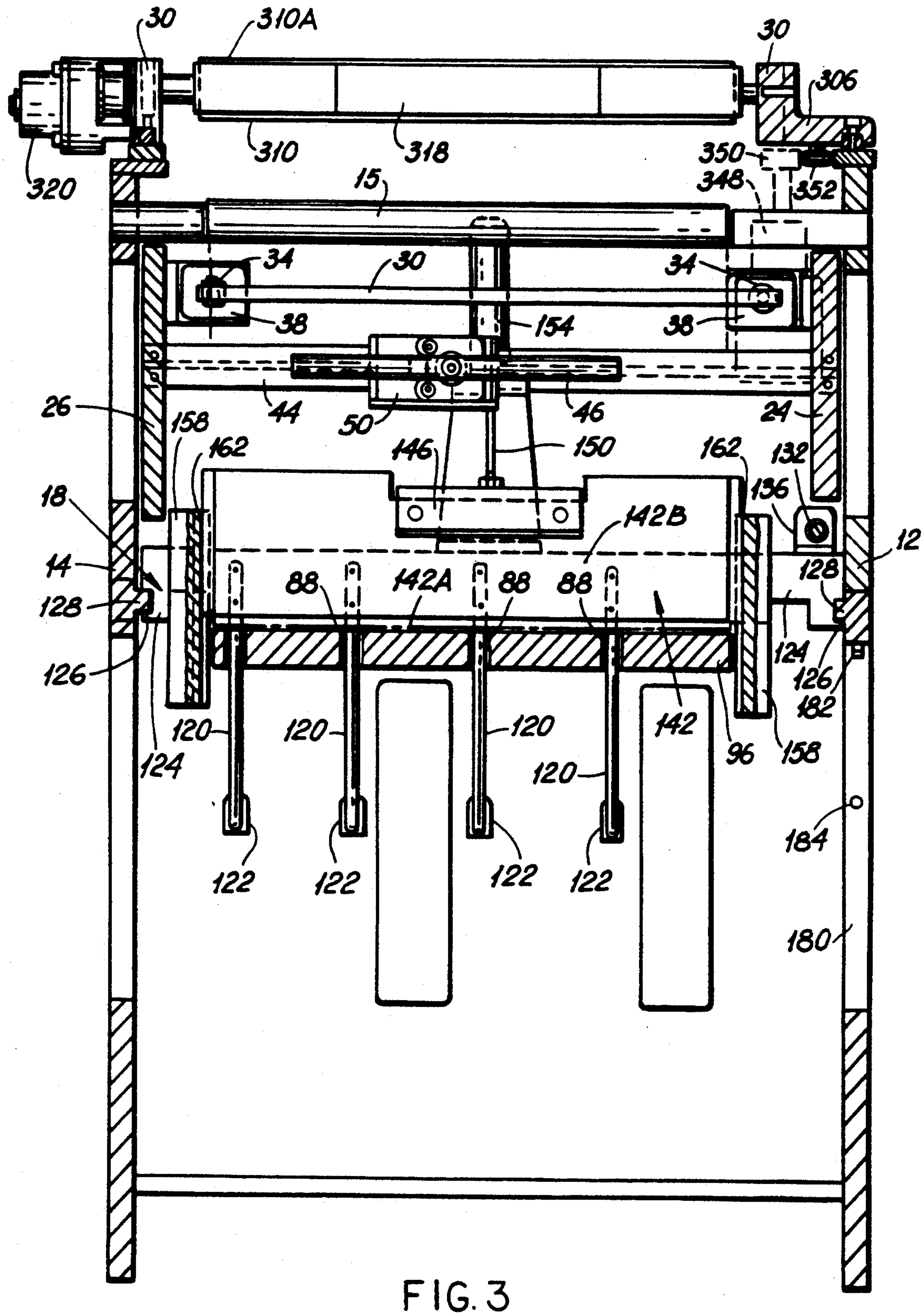
FIGS. 3 and 4 are cross-sectional views according to the lines III—III and IV—IV of FIG. 1, respectively.

In this case the tearing operation remains unchanged whereas (apart from special cases) the folding device is no longer operating whereby the roll 68 is locked in the position in which the axial passage 70 is placed in a vertical position permitting the free passage of the paper band already provided with foldings (FIG. 1A).

The compacting pistons remain on the contrary in operation, since in that way possible bulgings of the paper deriving from the passing through the laser printer, especially in the case of the so called hot laser printers, are compensated, so as to prevent or limit drawbacks such as that of the "bourrage" which might cause an incorrect or improper operation and consequently a stopping of the apparatus and thus of the operating line.

As regards the operation of the apparatus according to the invention the following features must be noted; these are very important as regards the operativity and functionality. The laser printers now being used allow for a stopping time of up to 3–4 seconds with a possibility of immediate restarting of the operation. While this time may be satisfactory as it is objectively short, the laser machine also automatically starts an autonomous proceeding of self cleaning which leads to and results in a stopping time of 15 seconds or more time.

It is thus evident that, apart cases of jamming or other causes of bad operation, the service apparatus and particularly that of the receiving one downstream of the printer must respect those very short time periods and take them into consideration.

As it has been already pointed out, the receiving apparatus must not only provide for the accumulation in form of packages of the arriving continuous band but also for the tearing, for the folding of the band (when the feeding takes place from a reel), for the lowering of the receiving plane and for the removal of the completed package as well as for the return of the receiving plane in the initial receiving position of the band S restarting arriving from the printer. Otherwise stated, the omission of the temporary supporting plane which is characteristic of the apparatus according to the known prior art, results in lost time. This omission of the temporary supporting plane results in a temporary stopping of the paper arrival from the laser printer. A short stoppage is possible only provided that such a temporary stopping is limited to a maximum time of 4 seconds. And, this maximum time of 4 seconds is now made possible by the novel operating principle on which the present invention is based, namely by substituting the continuous motion with a pulse motion consisting of a number of advancement and stopping steps of the paper.

Moreover, the apparatus must also be able to carry out the so-called "job-work" or "job separation" namely the tearing within the same final package of groups or sheets which for example are printed for different customers, which involve intermediate operations of tearing, always with a temporary stopping of the paper arrival and consequently of the laser printer.

The experiment carried out with the apparatus according to the present invention has demonstrated that it permits those requirements to be respected and particularly:

a) for the intermediate tearing (job separation) it can be carried out a time not higher than 100 milliseconds; and b) for the operations carried out when the package is completed, comprising also the lowering of the receiving plane, the removal of the finished package and the return of the receiving plane to the initial position, the time necessary is of the order of 3.5 seconds.

By considering the time involved the main inventive feature of the present invention can be better appreciated.

In the laser printers the continuous paper band is advanced with a continuous motion in a time T which is obviously a function of the size of the single forms composing the bands.

Since such a size varies in a standard manner from 8 to 16 inches with variation intervals of 1/6 inch, it is evident that the time T in the case of the 8 inch size is just a little higher than half that relating to the 16 inches size. According to the invention this time T has been divided in two fractions $t_1$ and $t_2$. $T_2$ relates to the operations to be carried out, for example the folding of the continuous band, whereas $t_1$ is the effective dragging time. According to the present invention $t_1$ represents a fraction of T and which is about 0.6 T in the case of the 8 inch forms and attains higher values (0.8–0.9 T) in the case of 16 inch forms.

It is evident that once the problem is solved in the case of the 8 inch form, no difficulties are encountered for greater sizes.

Provided that $t_1$ is greater than 140 msec and $t_2$ is less than 90 msec it is possible with a stepping motor provided with suitable and known control circuits to obtain operation times of the stepping motor and consequently of advancement of the paper of the order of 140 msec, apart from the acceleration and the deceleration times of the motor which are anyhow of the order of 20–25 msec.

In addition, by means of a suitable microprocessor control logic, conditions of paper advancement may be controlled requiring acceleration or deceleration slopes more or less inclined and for each condition are maintained strictly constant.

Consequently each time this control logic is instructed with suitable commands, for example about the size of the form which is processed in the laser printer, the time $t_1$ is automatically fixed and consequently the advancement of the paper in the tractor 11 is determined.

Since $t_2$ as already stated is constant, the rate of the pulse advancement determines also the operation rate of the several mechanisms, which are also connected to the same logic, namely the cross perforation device, the form folding mechanism (in the case of feeding from reel), the pressing of the edges of the sheets laid down onto the receiving plane.

By changing the instruction of the control logic all the above mentioned rates are correspondingly modified as a function of the pulse motion of the tractor 11.

When special operations are involved, such as the job separation or the tearing of the last sheet of a complete package, the further condition is involved of not overcoming the maximum time of stopping of the laser printer to prevent it from entering the self-cleaning phase.

This means that the figures of time as previously given, although being adherent to the real situation, are not a limitation.

In this way the advantages of the apparatus according to the invention can be clearly seen, it permitting from one side an elimination of complicated mechanisms, related to the use of temporary supporting planes as well as devices comprising a cutting blade, with the attendant difficulties of exact cutting at the folding edge of paper band or continuous form, and from the other side a satisfactory service with respect to the requirements of the laser printer.

Among the advantages deriving from the present invention it is also worthwhile to note the advantage of obtaining the correct formations of the form package onto the receiving plane.

As well known to those skilled in this art, the high speed of laying the paper down onto the receiving plane together with the stresses which the paper undergoes in passing through the laser printer cause the package to take a non perfectly parallelepipedal shape, and a warped shape.

This drawback, to date is unavoidable in the receiving machines of the prior art, and can be and is eliminated with the apparatus according to the present invention by two types of expedients.

Firstly, since the folding command especially in the case of feeding from a reel is given with respect to the length of paper which is advanced by the tractor, it is possible to intervene on the folding position, staggering it in advance or in a delayed position with respect to the initial position by a minimum spacing, for the precision 1/48 inch, whereby the warping is compensated as the laying down continues. It is worth to note that in the case of feeding from a package, such a measure can be activated by again repeating the staggered folding.

Secondly, the apparatus may act on the folding parallelism by recalling the paper band arriving to the folding mechanism. In order to obtain such a result it is sufficient to incline the axis of the deviating roller downstream of the tractor with respect to the horizontal position and in the position in which the band S takes the vertical direction.

To this end it is sufficient to mount the aforesaid roller 15 onto two end supports, which can be adjusted in a fine and precise manner. This is so because it is obvious that the variation of laying with respect to the horizontal one corresponds to very small angular values, by few degrees.

Another feature to be pointed out is that in the preceding description reference is often made to synchronized commands and to the logic of the apparatus.

To date, there are available electronic means such as the microprocessors by which the required logical sequences can be readily realized and by which signals or commands can be instantaneously transmitted. Thus it is not necessary to provide a detailed description of this logic, it being enough to identify the functions and their interrelationship.

According to the preferred embodiment of the present invention the exit service apparatus with respect to the laser printer is combined with an apparatus for the splicing of the last sheet A of a package to the first sheet B of the next package, obviously in the case of the feeding from packages.

In the specific case the splicing apparatus 16 forms the upper plane of the exit service machine and comprises two longitudinal members 302 and 304 the second of which is vertically aligned with the shoulder 14, whereas the first is extended by a bracket 306, the latter being engaged with the shoulder 12.

As it is clearly seen from the FIGS. 1, 2, 2A and 2B, the splicing device comprises two planes formed by two closed conveying belts, respectively 308 and 310, engaged with rollers 312, 314 and 316, 318, one of which is actuated by a stepping motor 320, 322 through a respective belt transmission 324, 326.

The body part of the device is shaped so that only the upper reach 308A and 310A of each conveying belt is accessible. Between the two conveying belts a splicing planar plate 328 is interposed, having at a first fixed end two pairs of pins 330, 332 to engage the said holes 329 of two sheets A and B to be spliced. Two other pairs of the corresponding pins 334, 336 are provided on a movable plate 338 which is crosswise displaceable relative to and along the mid line of the plate 328, depending on the size of the continuous forms to be spliced so as to engage the said dragging holes 335 of the opposite side with respect to that engaged by the pins 330, 332, in the plate 328 and in that openings 338 are provided for the temporary application of a vacuum to maintain the sheets to be spliced in position during the application of the splicing adhesive tape.

Together with the pairs of fixed pins 330 and 332 and the pins 334 and 336 rigidly connected to the movable plate 338 for movement of the pairs of pins 334, 336 outwardly with respect to the fixed pin pairs 330, 332, respectively, cutting means are also provided. The cutting means is in the form of cutting resistances actuatable to cut flush with the sheets to be spliced with the adhesive tape used for the splicing. This adhesive tape is of the type universally used for this type of splicing and has a center weakening line which must exactly match with the splicing line between the two sheets and between the ends.

Since the adhesivity of the adhesive tape may strongly hinder an exact splicing and raise difficulties for the next tearing of a spliced junction, the apparatus according to the present invention is provided with guide means for the adhesive tape which is unwound manually and drawn onto the splicing line. And, the tape is thereafter pressed against the underlying sheets across the splicing line either manually or with the help of a pressing roller. For this purpose, at both ends of the splicing plane 328 there are symmetrically provided two V shaped gorges, respectively indicated by the references 340, 342, positioned so that the bottom of each of the gorges is coplanar with the surface of the two sheets to be spliced and aligned with the splicing line. The two gorges are positioned outwardly of the two cutting resistances.

The sides 344, 346 of the V shaped gorges are manufactured from anti-adhesive material, for example polytetrafluoroethylene (Teflon), whereby small displacement or position adjustments of adhesive tape are possible before it becomes definitely pressed.

As already mentioned the splicing device 16 is positioned as a cover of the exit service apparatus of the laser printer. To permit the access from above to the internal parts of this apparatus, for example to insert the first length of the continuous form in the tractor 11, the device 16 is movable along the shoulders 12 and 14 and to this end a motor 348 is provided for driving a vertical axis pinion 350 which is in turn driven into engagement with a number of slidable wheels 352 vertically protruding downwardly from the bracket 306.

Of course the operation of the motor 348 in either direction causes the device 16 to be displaced in the sense of opening or closing.

Lastly at the slits of the body between the conveying belts 308A and 310A and the plate 328 safety switches are provided to prevent the entry of items and mainly damages to the attendant.

The invention has been described with respect to a preferred embodiment, and modifications and variations, conceptually and mechanically equivalent, are possible and foreseeable without departing from its scope as stated in the attached claims.

I claim:

1. A splicing apparatus for packages being fed to a laser printer, comprising:

a frame forming an upper surface, and adapted for association with said laser printer;

a pair of conveying belts having upper surfaces parallel and co-planar and operatively associated with said frame;

first motor means operatively coupled with said conveyor belts for the displacement thereof in the same direction;

a stationary splicing area provided between said conveyor belts comprising at a first end fixed anchoring means for a temporary anchoring of two sheets to be spliced, and towards a second end opposite to said first end movable anchoring means for the temporary anchoring of the two sheets to be spliced;

displaceable plate means for supporting said movable temporary anchoring means for movement relative to said fixed anchoring means;

cutting means mounted at both sides and symmetrically with respect to said fixed and temporary anchoring means;

adhesive tape supporting and unwinding means for unwinding a strip of adhesive tape comprising two V-shaped gorges, an apex of each of said gorges being flush and aligned with said splicing line, flanks of said gorges being coated with anti-adhesive material; and second motor means coupled with said frame for the translation of said frame between a first portion in which it forms the upper cover of an exit service apparatus of said laser printer and a second position in which it is displaced towards one end in a cantilevered manner, so as to uncover and give access to said exit service apparatus.

2. The splicing apparatus as claimed in claim 1, wherein said pair of conveying belts form two planes parallel with each other and including spaced rollers coupled with said belts and actuated by said first motor means coupled with one of said spaced rollers.

3. The splicing apparatus as claimed in claim 1, including a splicing planar plate positioned within said stationary splicing area and including a first fixed end having pairs of pins to engage holes at one side of two sheets to be spliced for forming said first anchoring means and a second end movable to different fixed positions crosswise along a midline of said splicing planar plate, said second end having pairs of pins to engage holes at another side of two sheets, and vacuum application means including openings in said planar plate for application of a vacuum to sheets for maintenance thereof in position for application of a splicing tape to said two sheets.

* * * * *

UNITED STATES PATENT AND TRADEMARK OFFICE

CERTIFICATE OF CORRECTION

PATENT NO. : 5,242,527

DATED : September 7, 1993

INVENTOR(S) : Luciano Meschi

It is certified that error appears in the above-identified patent and that said Letters Patent is hereby corrected as shown below:

On the title page,
[73] Assignee: Industria Grafica Meschi S.r.l., Livorno, Italy Signed and Sealed this Twenty-second Day of March, 1994

Attest:

BRUCE LEHMAN

*Attesting Officer* *Commissioner of Patents and Trademarks*